United States Patent [19]
Osborne

[11] Patent Number: 5,579,503
[45] Date of Patent: Nov. 26, 1996

[54] DIRECT CACHE COUPLED NETWORK INTERFACE FOR LOW LATENCY

[75] Inventor: Randy R. Osborne, Cambridge, Mass.

[73] Assignee: Mitsubishi Electric Information Technology, Cambridge, Mass.

[21] Appl. No.: 153,805

[22] Filed: Nov. 16, 1993

[51] Int. Cl.$^6$ ................................................. G06F 13/12
[52] U.S. Cl. ........................ 395/446; 395/481; 395/412; 395/427; 395/200.2
[58] Field of Search ..................... 395/200.17, 200.20, 395/850, 444, 445, 449, 420

[56] References Cited

U.S. PATENT DOCUMENTS

| | | | |
|---|---|---|---|
| 4,392,200 | 7/1983 | Arulpragasam | 395/467 |
| 4,823,259 | 4/1989 | Aichelmann, Jr. et al. | 395/449 |
| 5,274,782 | 12/1993 | Chalasani et al. | 395/325 |
| 5,440,698 | 8/1995 | Sindhu et al. | 395/200.08 |

Primary Examiner—Reba I. Elmore
Attorney, Agent, or Firm—Robert K. Tendler, Esq.

[57] ABSTRACT

A low latency network receive interface reduces the copying of message data by directly coupling the network to a cache and by providing an address-based message in which an incoming message block preincorporates an address so that messages can be directly stored in their final destination. In a preferred embodiment, the message data size is made equal to the cache block size so that cache blocks can be updated atomically. The small message size—which is equivalent in size to a cache block—also reduces transfer time, unlike Direct Memory Access (DMA) approaches in which a large amount of data must accumulate prior to transfer to main memory as a block. In one embodiment, the cache to which message data is directly coupled is divided into a message cache and a data cache, with the incoming message block coupled directly to the message cache. When an incoming message arrives, its address is compared with addresses in the data cache, with the data in the data cache at this address being purged in an invalidation process if the particular address is priorly occupied. The processor first accesses the data cache, and if no valid data exists at the corresponding address, it accesses the memory cache, which is in turn followed by accessing main memory if no valid cache data exists. This direct cache coupling of incoming message data eliminates latency due to buffering of the incoming message data in temporary storage prior to copying the message data.

8 Claims, 7 Drawing Sheets

FIG. 1
(PRIOR ART)

1. CALCULATE I.D. #
2. SEARCH FIFO BUFFER FOR I.D.
3. READ DATA FROM CORRESPONDING FIFO POSITION

DIRECT CACHE COUPLED NETWORK INTERFACE FOR LOW LATENCY

FIELD OF INVENTION

This invention relates to computer network interfaces and more particularly to a low latency network interface.

BACKGROUND OF THE INVENTION

To date, network interfaces, which function to transfer network data to and from a computer, have been designed either as add-ons for personal computers and workstations or as part of computers specially designed for parallel computation. While such interfaces have been sufficient in the past, the present tremendous increase in bandwidth of commercial networks is attracting new applications using networked personal computers, PCs, and workstations. Such commercial networks, PCs and workstations are far more cost effective than specially designed computer systems, e.g., for parallel computing. However, present network interfaces, particularly for PCs and workstations, do not achieve sufficiently small latencies for such applications.

Note that bandwidth refers to the data transfer rate or the rate at which data is transferred from sender to receiver over the network. Also, for the present purposes, latency refers to the time it takes for data from one location to be transferred and used by a processor, the compute engine of a computer, at a second location, i.e. the delay between the time data is sent until the receiver can act on the transmitted data. Note that the ultimate source and sink of data is a process executing on the sending processor and another process executing on the receiving processor, respectively.

As will be appreciated, part of the end-to-end latency is due to receive overhead in which there is a delay between the arrival of data at a receive node and the time that a process can act on this data. This time includes interrupt handling, processing and copying the data, and kernel traps for a process to read the data. Such receive overhead can be a substantial fraction of the end-to-end latency. In fact, receive overhead in some instances is nearly 90% of the end-to-end latency in conventional operating system implementations of local area networking.

For personal computers/workstations, network interfaces are loosely coupled to the computer memory system by an I/O bus which is distinct from the high speed bus used to couple the memory and processor of the computer. These interfaces are relatively slow, with latencies on the order of 1 msec in a LAN environment, which includes network, hardware and software components of the latency. In general, the network interface itself is a card, connected to a network which plugs into the I/O bus.

For parallel computers, network interfaces are tightly integrated into the design of the computer memory system from the start and hence achieve much greater performance, with latencies typically on the order of 1 to 100 usec. However, even a latency on the order of 100 usec precludes some real time and parallel processing applications.

Since in either the PC/workstation environment or in parallel computers the receive overhead contributes so significantly to latency, there is a necessity to improve receive overhead by improving the interface. Especially in the workstation environment where operating system overhead is the major contributor to latency, it is desirable to provide an interface which eliminates operating system intervention. In general, to maximize the class of exploitable parallel computing applications, it is desirable to have end-to-end latencies less than 10 usec.

Presently, there are two main techniques for transferring data from the network to a receiving processor. In one technique, the processor reads individual data words from the network and for each word decides whether to immediately act on the word or to store the word in memory for later use. This technique, called programmed I/O, is relatively slow because the processor fetches each word, with data being transferred at the slow single word access rate of the I/O bus.

In the second technique, called direct memory access or Direct Memory Access, the network device transmits a block of data words in a single operation directly to the computer memory. In addition to bypassing the word by word examination by the processor, this direct memory access technique transfers data at the burst or peak speed of the I/O bus. While this offers an improvement over the programmed I/O due to the block transfer of data at burst speed, the Direct Memory Access process still suffers from latency problems due to the time it takes to form large blocks of data and copy them into the main memory.

The designers of present network interfaces have concentrated on improving bandwidth. While present techniques can achieve exceptionally high data transfer rates, the delays in copying and processing the received data can negate the advantages of high data rates.

More particularly, as to PC and workstation network interfaces, with the recent commercial availability of high bandwidth networks such as FDDI which operates at 100 Mbps and Asynchronous Transfer Mode, ATM, which operates at 155 Mbps and the promise of 1 Gbps bandwidth networks in the near future, the network interface for PCs and workstations has been the focus of much recent research. It is now fairly well understood how to build network interface hardware and construct operating system software to achieve high bandwidth. As described by Druschel et al. in Network Subsystem Design, IEEE Network, pages 8 to 17, July 1993 and Banks and Prudence, A High-Performance Network Architecture for a PA-RISC Workstation, Journal of Selected Areas in Communications, pages 191–202, February 1993, the key to high bandwidth has been careful attention to minimize the number of data handling steps by the operating system during network data transfers.

One method of achieving high bandwidth is exemplified by a recent Direct Memory Access design, called the Afterburner, which puts a substantial message buffer on the network interface card and integrates this message buffer into the memory hierarchy with the goal of originating and terminating messages in the buffer. The Afterburner design is described by Dalton et al. in an article entitled Afterburner, IEEE Network, pages 36–43, July, 1993. The purpose of the Afterburner system is to eliminate transfers between the network interface card and main memory. However, as will be seen, buffering adds to the end-to-end latency.

The problem with Direct Memory Access-based interfaces, such as the Afterburner, is four-fold. First, the network data must be transferred to and from main memory via the I/O bus which is often slower than the main memory bus.

Second, the main memory, where network data is transferred to and from, is significantly removed in hierarchy from the processor. In today's PCs and workstations, the main memory is often two levels in the memory hierarchy below the processor. A typical state-of-the-art PC or workstation today has a primary cache on the processor chip for frequently accessed data, and another cache, the "secondary" cache, between the processor chip and main memory for less frequently used data. In order for an executing process to act on incoming network data, the data must eventually be loaded into a processor register, which means the data must be loaded from main memory to secondary cache to primary cache. In addition, outgoing messages are frequently generated directly by an executing process, in which case the message data must travel the reverse route through the memory hierarchy. The primary cache generally has an access time of about 5 nsec. The secondary cache generally has an access time in the 20 nsec range and main memory generally has an access time in the 200 nsec range. It will be appreciated that Direct Memory Accessing the network data to and from main memory virtually guarantees an additional 200 nsec delay per data word in copying data to the caches from main memory and vice versa.

Third, keeping the cache contents consistent with the main memory contents increases the receive overhead. Since the Direct Memory Access transfers data to and from main memory, it is possible for a cache to have a stale copy of the data. There are two ways to solve this problem. The usual way is to manually manage the caches. Before Direct Memory Accessing from main memory to the network interface, the operating system must explicitly flush all data to be Direct Memory Accessed out of the cache and back to main memory. Likewise, before Direct Memory Accessing from the network interface to main memory, the operating system must explicitly flush all data out of the cache that resides at the same address as the data that will be Direct Memory Accessed from the network. Since the operating system is involved, this manual cache consistency imposes significant overhead, in addition to the copying of data to and from the cache. A less common way to maintain cache consistency is to have the Direct Memory Access copy data to and from the cache in parallel to and from main memory. However, this requires both extra hardware and stalling the processor during Direct Memory Access activity. It also has the negative side effect of cache dilution. The fourth problem with Direct Memory Access-based interfaces is they typically use an inefficient message protocol and operating system structures. The typical message protocol is addressless, meaning that a message is inserted in a queue on arrival and consequently the operating system must intervene (which adds significant overhead) and usually copy the data. An additional problem, specific to the Afterburner approach, is that the message buffer on the I/O bus is a shared limited resource, which presents resource management and sharing issues. This problem may be mitigated by making the buffer sufficiently large, but this is not cost effective. As to parallel computers which are specially designed for parallel computing from the start, there has always been careful attention paid to achieving high bandwidth and low latency. The I/O bus network interface approach, as described for PCs and workstations above, was used in some machines like the Intel IPSC/i860 but is now mostly abandoned due to its high latency. Recent design and implementation work has concentrated on network interfaces higher up the memory hierarchy at either the cache or register level. The main example of the latter is the *T machine described by Beckerle, in an article entitled An Overview of the *T Computer System, COMPCON, 1993, and implemented by Motorola in which messages are received directly into registers on the processor chip. Although this approach achieves very low latency, it requires extensive modification of the processor chip.

Rather than direct coupling to processor registers, at the cache level there is a continuum of designs between simple cache level buffers to communication coprocessors. A very simple cache level interface, consisting of a message buffer addressed via the cache bus, is suggested by D. Henry and C. Joerg in an article entitled A tightly-coupled Processor Network Interface, published in Proc. of Fifth Int'l Conf. on Architectural Support for Programming Languages and Operating Systems, pp. 111–122, October 1992. This interface suffers from the same problem as the Afterburner message buffer interface. Since it is a small size globally shared resource, it presents a resource management and sharing problem. In the middle, the Thinking Machines CM-5, maps the network to the memory bus. While straightforward and simple, this approach does not attain particularly low latency. In the other extreme are coprocessor-based approaches, such as used in the Meiko CS-2 and the Intel Paragon parallel machines. These coprocessors are fully general processors that offload from the main processor message send and receive duties such as message formatting, interrupt handling, protection, and memory mapping. Further, with the exception of protection and memory mapping, the MIT Alewife machine implements similar functions in a hardware finite state machine rather than a full processor. These co-processor approaches are expensive in terms of hardware.

In order to minimize both cost and latency, the Fujitsu AP1000 attempts to integrate the network interface into the cache: messages are sent from the cache but are received into a separate buffer as described shortly. This technique is described by Shimizu, Horie, and Ishihata in an article entitled Low Latency Message Communication Support for the AP1000In Int'l Symposium on Computer Architecture, pages 288–297, May 1992.

As to the send operation for the AP1000, a message is composed in the cache and is then sent by Direct Memory Accessing the cache line directly to the network. Without changing the processor to support sending directly from registers, there isn't much one can do to improve on this "cache line sending" technique.

For the receive operation, rather than utilizing traditional Direct Memory Access techniques, the Fujitsu system utilizes a circular FIFO buffer coupled to the network and messages which incorporate a message ID number and the relevant data. The circular buffer is coupled to a cache in an attempt to integrate the network interface into the cache. However, the messages are not retrieved by address but rather by message ID number. The messages arrive and are stored in the circular buffer along with the message ID number. During message retrieval, a message is accessed by the message ID number. Thus it is first necessary for the Fujitsu system to search the buffer for the message ID number. If the message ID number is found, then it is possible to ascertain the buffer position and read out the data from that position. The result is that while it is possible to couple data rapidly to the cache bus, it is indeed an extremely slow process to receive data.

In summary, each AP1000 processor node has a circular buffer connected to the cache bus for receiving messages. This is in essence the same concept as the cache level message buffer in the above-mentioned article by Henry and Joerg, except that the AP1000 requests a latency intense search through the receive buffer to find a matching message, thus negating any latency gains otherwise achievable.

There are also three additional problems with separate cache-level message buffers:

First, as to buffer management, since the buffer is a finite sized resource shared by all communicating processes there are the usual problems of reclaiming buffers, ensuring fair distribution of buffer blocks amongst all processes, and buffer overflow. Pressure arises from the need to keep the buffer size rather small in order to be suitably fast and not inordinately expensive. Secondly, as to integration with process address space, because of the difficulties in integrating a small shared buffer into a page-based protection scheme, the message buffer has to sit outside the process address space. This poses a number of protection issues such as how to prevent a process from reading or writing on top of messages for another process. Thirdly, as to performance, to send or receive data, an application has to transfer the data to or from the message buffer. This means an extra copy step. While the access time of the message buffer is likely to be quite small, the application code must be organized to copy such messages when needed and the actual copy will require main memory accesses if there are no free cache blocks.

By way of further background, note that parallel computers differ in two very important ways from PCs and workstations. First, they are often single user environments, so no protection is necessary to contain the accidental or the intentional maliciousness of a user from others. Second, network in parallel computing machines is private to the machine, so the network may be manipulated to control protection issues as in the CM-5. In contrast, the PC and workstation environment is a multi-user environment and the network is public. Thus the network interface must provide protection to contain the accidental or intentional maliciousness of a user from others. The parallel computer environment is often a single user environment with no protection since none is necessary. It is therefore important that a network interface design improve on the Fujitsu AP1000 cache interface while at the same time guaranteeing a protected, multi-user environment which connects to a public network.

Note that another important direction for achieving low latency in parallel computing, is to incorporate the address of the message handler in the message itself, obviating the need for buffering of the message data at the receiver. This technique as described in Active Messages: A Mechanism for Integrated Communication and Computation by von Eicken et al. Proceedings of the 19th Annual International Symposium on Computer Architecture, May 1992. This paper describes an exclusively software approach not involving caches.

SUMMARY OF THE INVENTION

Rather than utilizing message ID numbers as in the Fujitsu system, the protocol for the Subject System requires that the message be identified by address. That is, each message contains information indicating the destination memory address in which the message is to be stored and each incoming message is stored directly into that address. This is the same address that the processor uses to access the message data. Thus, the buffering that other schemes employ, such as the Fujitsu circular FIFO buffer, is eliminated, which eliminates first copying data to a buffer at no particular or designated address, and then copying data from the buffer to memory at an address calculated on the receive side. In the case of the Fujitsu scheme, the Subject System also eliminates the search for a matching ID in the circular FIFO buffer. The technique of preincorporating the destination address in the message is similar to, but not the same as the Active Messages technique. With Active Messages, the address in the message specifies the location of a message handler which is invoked on message arrival to pull the message out of the network and act on it. In the Subject System, the address information in the message specifies the location to store the message, not the location of a message handler.

In the present invention, message data with preincorporated addresses is sent and received directly to and from the cache in the memory hierarchy. Specifically, the Subject Invention employs an address-based message protocol in which each message contains either the address in the destination such that it can be directly stored or preincorporated address information which can be used by the receive side to place data with the correct address in the cache. The direct cache connection bypasses slow I/O buses and hardware message buffers and the preincorporated message address eliminates any need for operating system intervention or other software to copy or move the message within the memory hierarchy. Consequently, the Subject System is exceedingly fast.

In a more general embodiment, the Subject System puts messages directly in the memory hierarchy in a position—cache or main memory—in accordance to their need of access by the processor. Specifically, the address-based message protocol puts messages in the memory hierarchy immediately so there are no external shared buffers to manage, as in the aforementioned Afterburner system. Furthermore, each message may be put in a position in the memory hierarchy in accordance with its need of access by the processor. This minimizes the movement, and hence copying, of message data within levels of the memory hierarchy.

Returning to the first embodiment, a low latency network interface is provided which reduces the copying of message data by directly coupling the network to a cache and by providing an address-based message in which an incoming message block preincorporates an address so that messages can be directly stored in their final destination. In a preferred embodiment, the message data size is made equal to the cache block size so that cache blocks can be updated atomically, eliminating the need for complicated and slow circuitry for updating partial cache blocks. The small, cache block-equivalent, message size also reduces transfer time, unlike Direct Memory Access approaches in which a large amount of data must accumulate prior to transfer as a block. In one embodiment, the cache to which message data is directly coupled is divided into a message cache and a data cache, with the incoming message block coupled directly to the message cache. When an incoming message arrives, the message address is compared with addresses in the data cache, with the data in the data cache at the message address being purged in an invalidation process if the particular address is priorly occupied. The processor first accesses the data cache, and if no valid data exists at the corresponding address, it accesses the memory cache, which is in turn followed by accessing main memory if no valid cache data exists. This direct cache coupling of incoming message data eliminates latency due to buffering of the incoming message data in temporary storage prior to copying the message data. In additional embodiments, means are provided to prevent interference between caching of message data and processor cache access.

While directly storing message blocks in a cache can result in lower latency, with a single cache design incoming messages will displace data in the cache which the processor was using. This reduces the likelihood that the processor will find the data it seeks in the cache.

In order to improve upon the performance of the single cache design, in a further embodiment the cache is divided into two caches, the message cache and the data cache. Incoming messages affect only the message cache, leaving the data in the data cache intact for use by the processor. However, there can exist a consistency problem wherein a given memory address is cached in both caches but has different data associated with that address in each cache. To resolve this inconsistency, when an incoming message arrives, its address is compared with addresses in the data cache, with the data at this address in the data cache being purged in an invalidation process if the particular address is priorly occupied. This ensures that there is no other data in the cache at this address.

In this embodiment, the processor first accesses data in the data cache if there is data at the corresponding address. If there is no data in the data cache at this address, the processor accesses the message cache. If there is no data at the particular address in both the message cache and the data cache, then the main memory is accessed.

There is, however, a further problem. The problem is how the message cache can check for a conflicting address in the data cache without interfering with the processor accessing the data cache. The processor may access the data cache simultaneously with the validation procedure associated with entry of new data in the message cache. In order for the message cache to have minimal impact on the data cache, because the processor accesses the data cache, for instance, every cycle if it is a primary cache, and because the message cache is accessed rather infrequently, in one embodiment, the address portion of the cache entry or tag is duplicated in another tag section within the data cache. The result is that the data cache is augmented with a second tag memory which is at all times a copy of the first tag section. Thus the data cache is divided into two main sections. The first section is a conventional tag and data memory corresponding to an address tag-and-data section. The second section is the tag alone corresponding to an address-only section in which the tag is a portion of the address. Checks for address inconsistencies involve only the second tag section of the data cache. This means that the processor can access the tag-and-data section of the data cache without interference from the checking of conflicting message addresses. This permits availability of the tag-and-data section of the data cache to the processor most of the time, while permitting the tag-only portion of the data cache to be available for checking validation conflicts between incoming message addresses and those already created in the data cache.

It will be appreciated that the tag-only section of the data cache need not take the same form as the tag-and-data section of the data cache. In the design described so far the two tag sections are the same size. They need not be the same speed however. The duplicate tag section needs to only operate at a speed suitable for the network interface, not for the processor.

In a variation on this design, the duplicate tag can provide a precheck for an address conflict and then if a possible conflict in detected, the processor is blocked and the original tag is checked for a conflict. Given that conflicts should be rare, this will add insignificant delay while allowing the duplicate tag section to be of a smaller size than the original tag section. In this "precheck" arrangement of the duplicate tag, the duplicate tag section only needs to have an inclusionary property: it must signal a conflict when one might exist, but it is acceptable to falsely signal a conflict when none exists. This allows the duplicate tag section to determine a match, for example, based on some smaller number of address bits than the original cache uses.

In order to maintain a copy of the addresses in the tag and data section in the tag-only section, any change made in the address of the tag-and-data section must be made to the duplicate tag section.

Although infrequent, there is still a possibility of interference while writing an address to the duplicate tag section, when the processor is changing an address in the tag-and-data section. In a further embodiment, this is resolved by giving priority to the writing of an address change from the tag-and-data section of the data cache over the duplicate tag section. If interference still persists, in another embodiment, the duplicate tag section of the data cache is partitioned into N subsets, each of which is accessed independently. This reduces the probability of interference by a factor of N.

The direct coupling of the network to data cache can also provide high bandwidth in addition to low latency. Such direct coupling is best either for short messages, to minimize eviction of other data from the cache, or data that will be used soon by the processor, so the data will not be evicted from the cache to make room for other, more immediately used, data. An example of the former is the low latency communication in parallel computing and real time systems mentioned so far. An example of the latter is multimedia or video communication where the processor has to process the data immediately, eg., processing each image frame. In this latter case, direct coupling to the data cache can be a superior approach to various Direct Memory Access-to-memory schemes, such as the Afterburner design described earlier, since the incoming data is put immediately in the cache where the processor needs it.

In summary, the objective of the Subject Invention is to reduce communication latency by reducing the copying of message data by directly coupling the network to a message cache. This message cache is fully integrated into the memory hierarchy, so there is no need to copy data from a message buffer to the memory hierarchy before a process can access the data, as in other approaches, notably the Fujitsu AP1000. At the same time, the message cache is distinct from the data cache in the memory hierarchy so that message activity has minimal impact on the data cache and hence processor performance on non-message computing. Note that in some memory Direct Memory Access approaches the data is also echoed into the data cache. This can "dilute" the data cache. Since the Subject Invention can be implemented at the secondary cache level, no expensive, special purpose or custom processor modifications are required as in other approaches.

Two aspects of the message protocol are essential to the efficient low latency operation of the interface. The first aspect is addressed-based messages, so that messages can be directly stored in their final destination, eliminating the need for copying in buffering messages. The second aspect is a message data size equal to the cache block size so that cache blocks can be updated atomically. This eliminates the need for complicated and slow circuitry for updating partial cache blocks. The small message size also reduces the transfer time, unlike in most Direct Memory Access approaches where a large amount of data must accumulate before a large block of data is transferred to main memory.

BRIEF DESCRIPTION OF THE DRAWINGS

These and other features of the Subject Invention will be better understood taken in conjunction with the Detailed Description and the Drawings of which.

DETAILED DESCRIPTION

Figure 1:
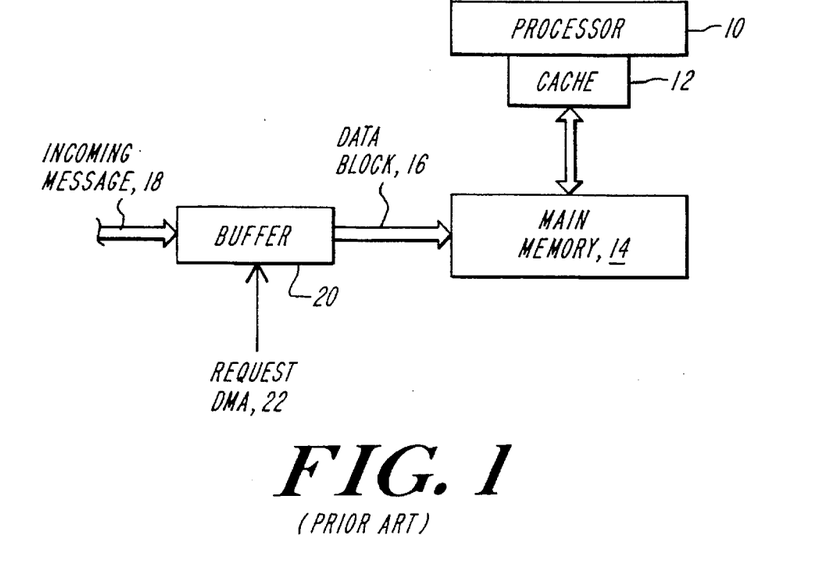
FIG. 1 is a block diagram illustrating prior art Direct Memory Access based system for loading block data into main memory prior to use by a processor.

Referring now to FIG. 1, typically in direct memory access a processor chip 10 is coupled to a secondary cache 12 which is in turn coupled to a main memory 14 into which a data block 16 is coupled. Data block 16 corresponds to an incoming message 18 provided to a buffer 20 which upon a Direct Memory Access request 22 transmits the data block at burst speed to main memory. As discussed hereinbefore, the latency of Direct Memory Access-based interfaces is significant due to the overhead to keep the data cache consistent with the data in main memory, the cost in transferring data in main memory to the processor, the time for accumulating a block of data in a buffer prior to high speed transfer to main memory and the slow I/O bus structures.

Figure 2:
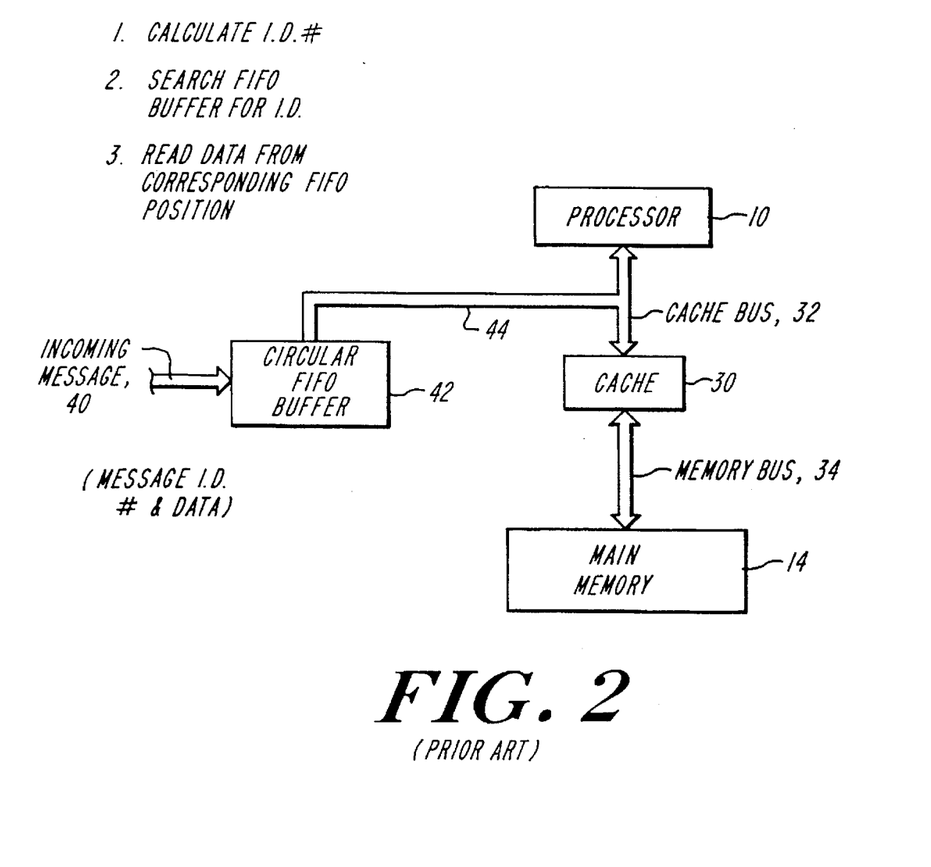
FIG. 2 is a block diagram of a prior art system illustrating circular buffering of incoming message data prior to coupling of the data onto the cache bus for coupling to processor.

Referring now to FIG. 2, the system depicted generally is the Fujitsu AP1000 system in which processor 10 is coupled to a cache 30 via a cache bus 32. Cache 30 is in turn connected via memory bus 34 to main memory 14. An incoming message 40 which includes a message ID number and data is coupled to a circular first in/first out, FIFO, buffer 42. The output of circular buffer 42 is directly coupled to cache bus 32 as illustrated at 44.

In operation, for the processor to read the intention of a message, the processor must search the circular FIFO buffer for the particular ID number. Thereafter data is read out from the corresponding FIFO position and transferred to an appropriate address with the receiving process's address space. The result of providing the incoming message with a message ID number as opposed to an address contributes to receive overhead due to the necessity of the above calculation to permit searching the FIFO buffer.

Figure 3:
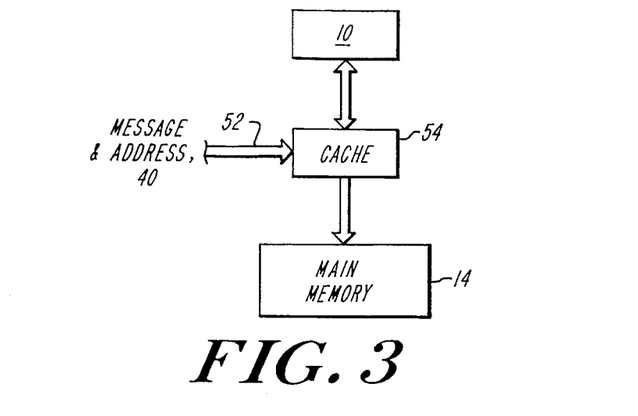
FIG. 3 is a block diagram of the Subject Invention illustrating direct coupling of message and address to a cache in which the data cell or block associated with the message is of a size equal to that of a cache block.

Referring now to FIG. 3, rather than buffering incoming messages, in the Subject System the format for the information or message preincorporates an address such that the message data can be immediately stored in a cache at the appropriate address. In one embodiment, a message and address 40 is applied as a cell or block matching the block size of a cache 54 over a bus 52 directly to cache 54 which is coupled to processor 10 and main memory 14 as illustrated. As a general proposition, the access time for a cache is on the order of 20 nanoseconds, whereas the access time for main memory is, in general, in the 200 nanosecond range. Thus, the ability to directly couple incoming message data to a cache can take advantage of typical cache access times to reduce receive overhead and thus end-to-end latency.

It will be appreciated that should a message arrive with an address that is already occupied in the cache, means are required to invalidate or purge the old cached data at this address.

It will also be appreciated that incoming messages will require exclusive access to the cache and thus impair the performance of the processor's access to the data cache. More importantly, such incoming messages will displace data from the data cache that the processor may be accessing. In order to mitigate these impairments, and referring now to FIG. 4, cache 54 is divided into a message cache 60 and a data cache 62. It will be noted that message cache 60 and data cache 62 are coupled to main memory 14 as illustrated. In operation, a message with its address is inserted into message cache 60. Data cache 62 will have previously been supplied with addresses and data from main memory 14. Message cache 60 and data cache 62 are both coupled to processor 10 so that processor 10 can first access data cache 62 at a given address. If there is no valid data at this address in data cache 62, processor 10 then can access message cache 60. If there is no valid data in message cache 60 at this address, then the main memory is accessed and data at this address is copied to the data cache. It will be further appreciated that the message and address inserted in message cache 60 can be evicted to main memory 14. This can occur when the occupied message cache slot is required for newer data. Note that data and addresses can be copied into data cache 62 either from main memory, or from processor 10, or as a result of copying data from main memory that was priorly copied to main memory from message cache 60.

Figure 4:
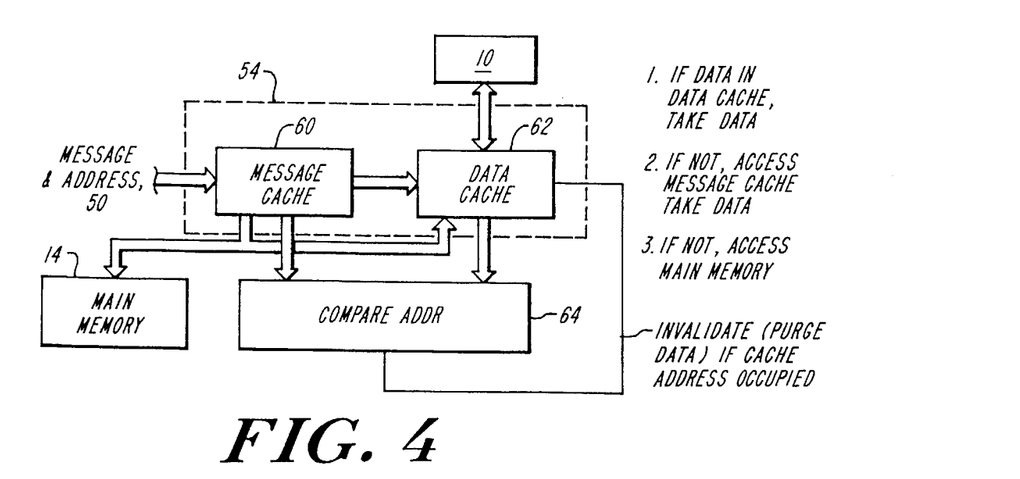
FIG. 4 is a block diagram illustrating the division of the cache of FIG. 3 into a message cache and a data cache to prevent interference between message arrival and caching and processor access to the data cache.

The addresses in the message cache and the addresses in the data cache are compared at 64 and if a conflict arises, in one embodiment, data in data cache 62 is invalidated or purged.

In summary, there can exist a consistency problem if different data is cached at the same address in both caches. To resolve this inconsistency, when an incoming message arrives, its address as stored in message cache 60 is compared at 64 with addresses in data cache 62, with the data at this address in the data cache being purged in an invalidation process if the particular address is priorly occupied.

In the Subject System, when processor 10 seeks to access data at a given address, it first accesses data cache 62. If no valid data exists at this address, processor 10 accesses message cache 60 to retrieve the data. Assuming that there is no valid data at either the data cache or the message cache, then processor 10 will access main memory 14.

The result of dividing the primary cache into a message cache and a data cache is that processor access to data is relatively unimpeded. This is because incoming messages affect only the message cache, leaving the data in the data cache intact for use by the processor.

There is however the problem of how the message cache can check for a conflicting address in the data cache without interfering with the processor accessing the data cache. This occurs when the processor is accessing the data cache simultaneously with the validation procedure associated with the entry of new data in the message cache.

Figure 5:
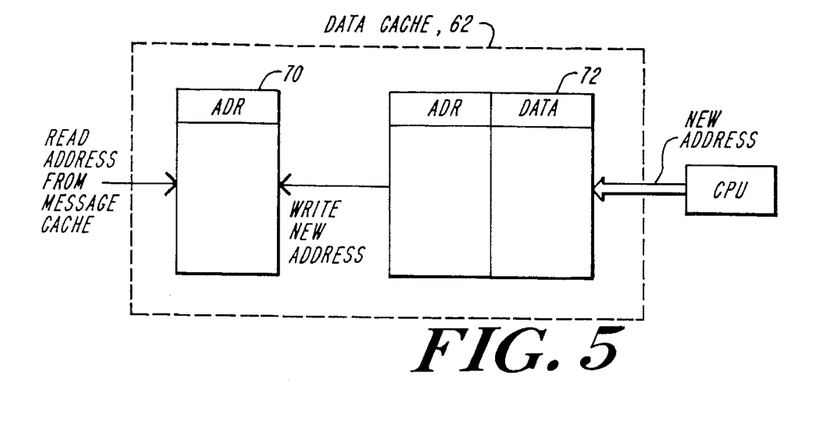
FIG. 5 is a block diagram illustrating the division of the data cache of FIG. 4 into a tag-only portion and a tag-and-data portion to prevent interference with processor access when new addresses are available from the message cache of FIG. 4.

In order for the impact of the message cache to be minimum on the data cache, referring now to FIG. 5, the data cache 62 is divided into two portions: an tag-only or address-only tag portion 70 and an tag-and-data portion 72. It will be appreciated that tag-and-data portion 72 is a conventional tag-and-data memory, whereas the address only portion is a tag memory only. It will also be appreciated that checks for address inconsistencies involves only the tag-only or address-only portion 70 of the data cache. The result is that the processor can access the tag-and-data portion 72 without interference from the checking of conflicting message addresses between the data cache and the message cache. This permits availability of the tag-and-data portion of the data cache to the processor most of the time, while permitting the tag-only portion of the data cache to be available for validation conflicts between incoming message addresses and those already created in the data cache.

Figure 6:
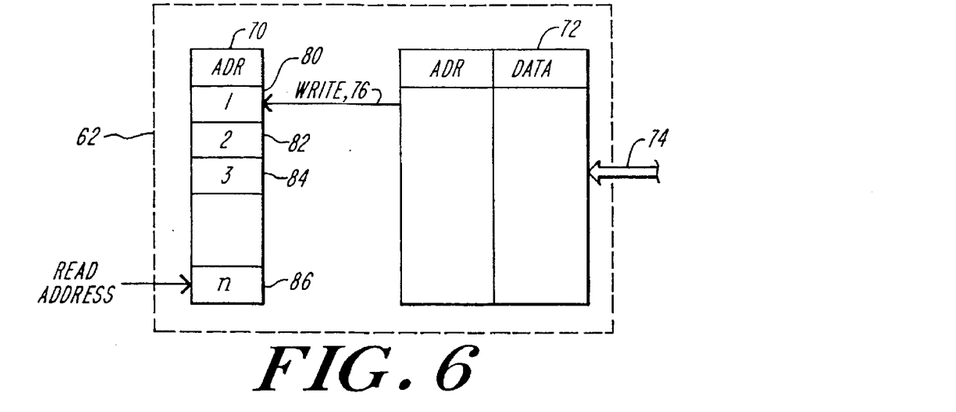
FIG. 6 is a block diagram illustrating the division of the address cache of FIG. 5 into numerous sections such that a write from the tag-and-data portion of the data cache can occur in one section simultaneously with the reading in of an address from the message cache in another section.

Referring now to FIG. 6, note that conflicts can nonetheless arise when processor 10 writes a new address 74 into portion 72, which results in a new address being written via line 76 into the tag-only portion 70. This presents a problem if during the writing of a new address into tag-only portion 70, a new address is read in from the message cache simultaneously.

Although this conflict is infrequent, one way of alleviating the conflict is to divide up tag-only portion 70 into a number of different sections 80, 82, 84 . . . 86, with new addresses being read in to a different section than the section into which addresses from tag-and-data portion 72 are written. If memory 70 is divided up into N sections, then this type of conflict will occur 1/Nth less frequently.

While the above description is a general one describing both a new format and direct coupling of the network to a cache, the following describes in more detail the Subject Interface adapted to ATM networks and multi-user environments. Because of the potential for the subject interface to be used in a multi-user environment, in one embodiment, a fast lookaside buffer is provided for protection and address mapping, with the message cache/data cache receiving message data directly after validation procedures.

Specifically, for the multi-user environment, in one embodiment, the subject interface utilizes a communication protocol in which each message contains an ID for the process to which it is sent, a virtual address within this process's address space, and a block of data to be deposited in memory starting at the virtual address. Desirably, the block of data is always a fixed size equal to the cache block size. Note that every message is effectively a remote write. It is therefore up to the destination to decode the data block contents and send a reply message if that is what is required.

Figure 7A:
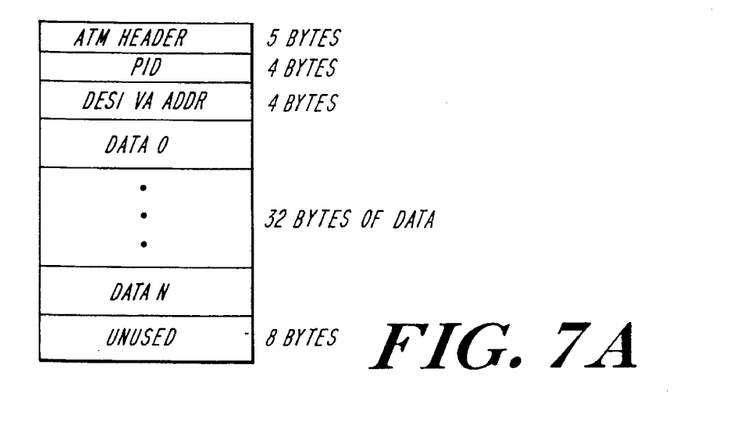
FIG. 7A is a diagram illustrating one possible format of a 53 byte ATM cell in which the destination virtual address is incorporated along with the ATM header and the data.

As to message format, in the above protocol, FIG. 7A shows a one possible asynchronous transfer mode or ATM format. Note that a process identification number of PID, and a destination virtual address, VA, is included in the format.

Figure 7B:
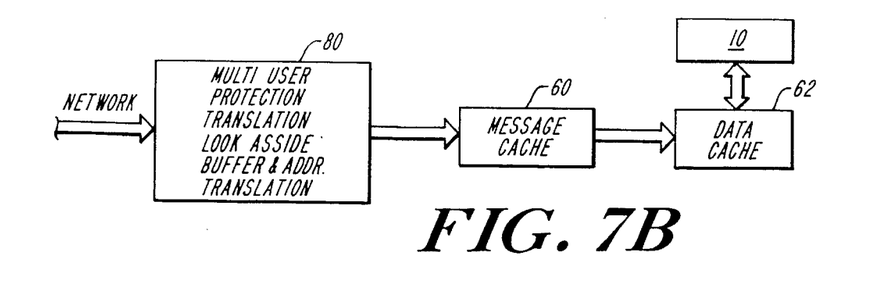
FIG. 7B is a generalized block diagram illustrating the use of a translation lookaside buffer and address mapper for multi-user protection.

Referring now to FIG. 7B, since in one application the Subject Interface is to be utilized in the multi-user environment, a multi-user protection translation lookaside buffer 80 is inserted in the system before message cache 60. It is the purpose of lookaside buffer 80 that message traffic be validated and that any address mapping from a virtual address to a physical address be performed.

Figure 7C:
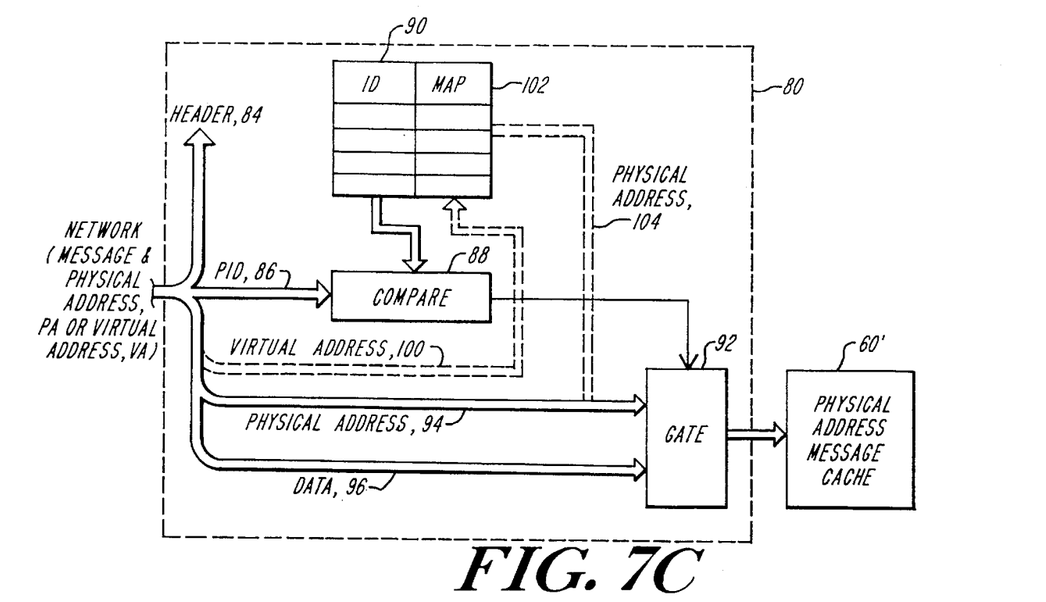
FIGS. 7C and 7D are respectively block diagrams for the lookaside buffer of FIG. 7B for physical address and virtual address message caches.

Typically, a virtual address is transmitted in order to minimize the sender's knowledge about the physical address allocation in the destination. This virtual address must be mapped to a physical address, since most processors use physically addressed caches. It is, of course, possible to transmit the message with a physical address as illustrated in FIG. 7C. Here a header 84 is first stripped off and used elsewhere. The PID 86 is stripped off and provided to a comparator 88 which compares the PID with the identification number 90 for the particular process. Assuming that there is a match, gate 92 is actuated to gate physical address 94 and data 96 through to the physical address message cache 60.

Assuming virtual addresses are transmitted over the network, virtual address 100 is applied to a mapping unit 102 which in turn generates a physical address 104 which is applied through gate 92 to cache 60.

Figure 7D:
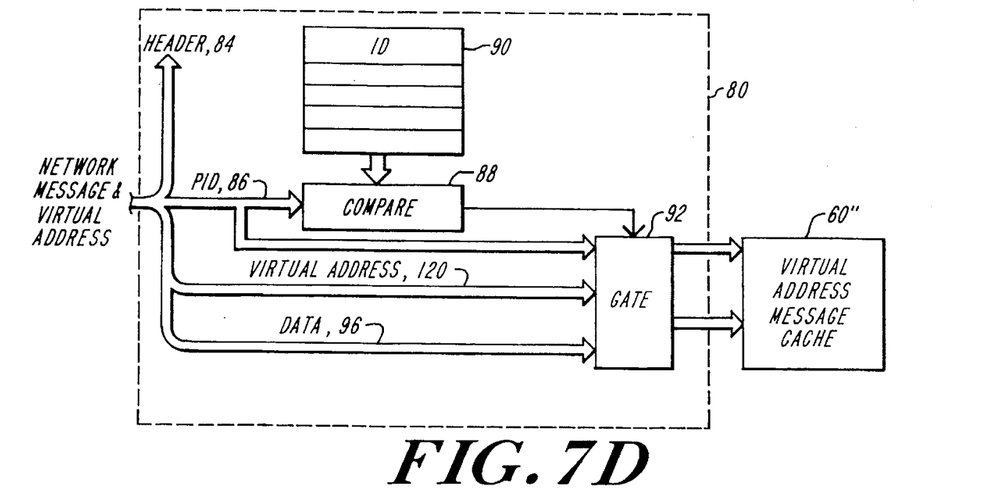

Referring now to FIG. 7D, when a virtual address message cache 60 is provided and with the protocol containing virtual addresses, a simplified system is illustrated in which PID 86 is compared at 88 with identification numbers 90, with a match again causing gate 92 to gate virtual address 120 and data 96 to the virtual address message cache. The PID field to the cache is used to disambiguate virtual addresses from different processes.

There are two alternatives to indicate that this protocol is in use for an ATM connection. The first alternative is to have the protocol bound to the connection the, VCI/VPI pair, on connection set up. The second alternative is to use the Payload Type, PT, field in the header to indicate the special protocol in use. While this alternative gives cell by cell protocol selection over a given connection, it would require overloading the function of some of the already assigned 8 possible values in the PT field.

Note that the message format in FIG. 7A is rather wasteful of space. Rather than sending a full virtual address, which would be 8 bytes long in a 64 bit address architecture, in one embodiment, illustrated by the protocol of FIG. 8A, one sends the offset from a base address. To avoid the need to add another message field for the base address, one sends a buffer ID which implicitly identifies the base address. This also implicity identifies the process and even allows a set of processes at the destination to share a buffer.

Moreover it will be noted that the message format of FIG. 7A somewhat ignores protection and security issues. To prevent an errant message being interpreted as a valid message, in one embodiment, each message is affixed with a random bit string. It is convenient to make the buffer ID such a 64 bit identifier. To protect against data corruption the message has an error code check field. These two features give reasonable but not fool-proof protection.

Figure 8A:
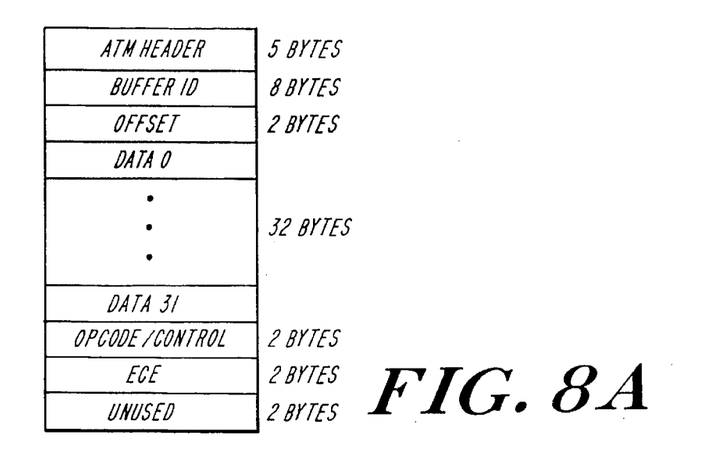
FIG. 8A is a diagram illustrating an improved format for a 53 byte ATM cell in which the address of the data is contained through the utilization of a buffer ID number, with the virtual address of the data being specified indirectly by specifying a particular buffer.

Note that in the protocol of FIG. 8A the offset field is 2 bytes in size and gives the offset, in cache block units, from the buffer base address aligned on a cache block byte boundary in the destination node. Thus, assuming 32 byte cache blocks, this offset field can span a buffer size of up to $2^{16} \times 32 = 2$ Mbytes. The opcode/control field specifies the type of operation to be performed at the destination node, eg., read, write, execute, etc., and any special control information such as interrupt on receive. For a read operation the reply address is stored in place of the data. Several possibilities exist for the unused bytes, namely, increasing the size of the offset field to 3 bytes giving a 512 Mbyte address range, and adding a second offset field to implement a write-and-read operation.

Figure 8B:
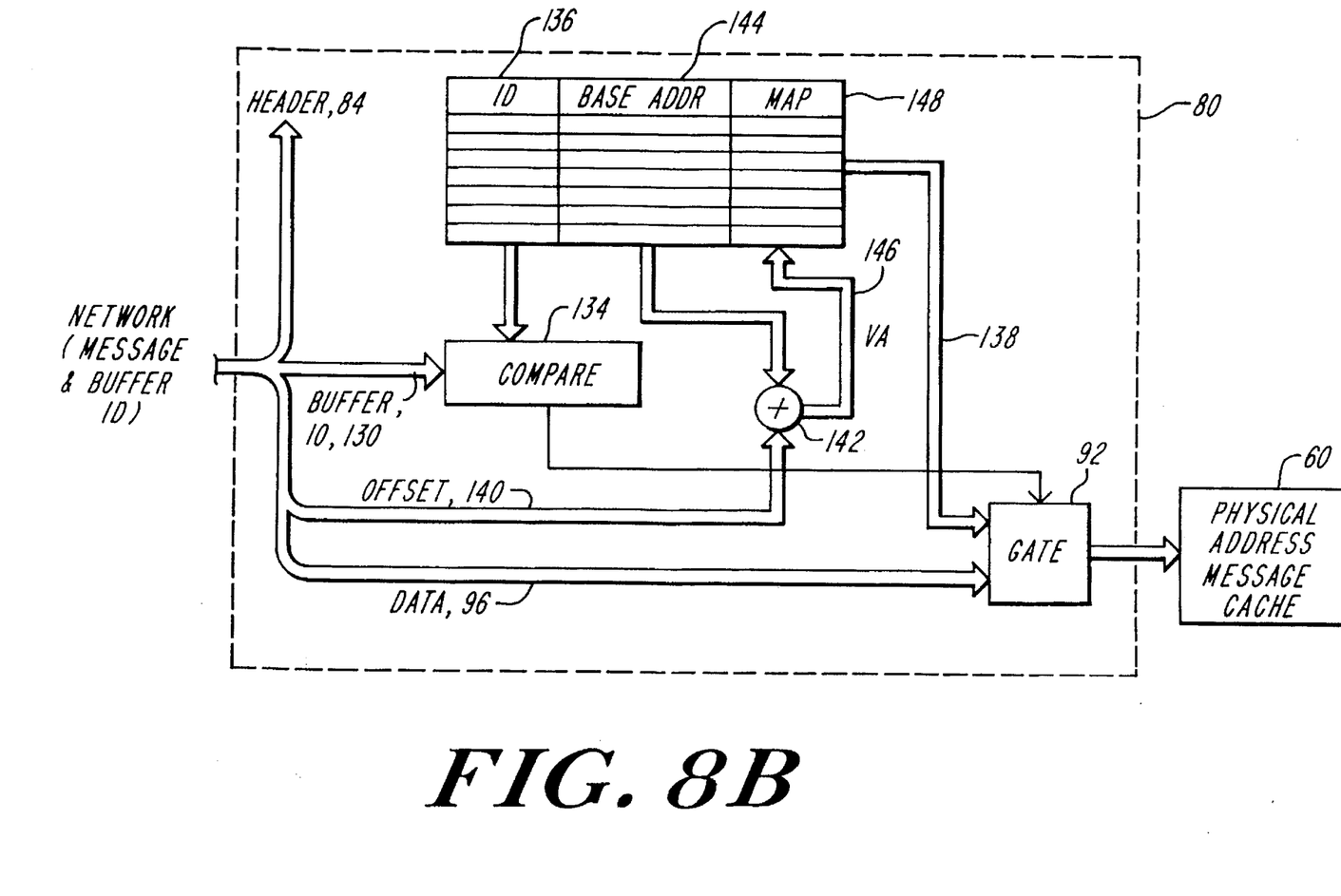
FIG. 8B is a block diagram of a lookaside buffer in which base addresses and offsets are used to generate physical addresses.

Referring now to FIG. 8B, assuming a physical address message cache 60, the network message and buffer ID as well as offset data, is applied to lookaside buffer 80. It will be appreciated that the header 84 is stripped off. The buffer ID number 130 is applied to a comparator 134 which compares this number with a buffer ID number 136, with a match activating gate 92 to gate data 96 to cache 60 along with a physical address 138 from the mapping operation. Simultaneous with the buffer identification number being transmitted, an offset 140 is coupled to a summing unit 142 which sums a base address 144 accessed by the buffer ID number 130 and with the offset provides the result as a virtual address 146 to a mapping process 148 which converts the virtual address to physical address 138.

Thus, lookaside buffer 80 contains protection and address mapping information set up by a "channel" allocation phase necessary for every point to point low latency message. The access rights of the message are checked relative to the stored protection information and if sufficient, the buffer in one embodiment translates the virtual address of the message destination to a physical address using a copy of the relevant entries in the page table map for that virtual address space. In the case of the first message format described above, the PID serves as a key into an associative cache where entries contain the access rights and virtual to physical page mappings. For the second message format described above, the look up and translation process is more complicated.

Figure 9:
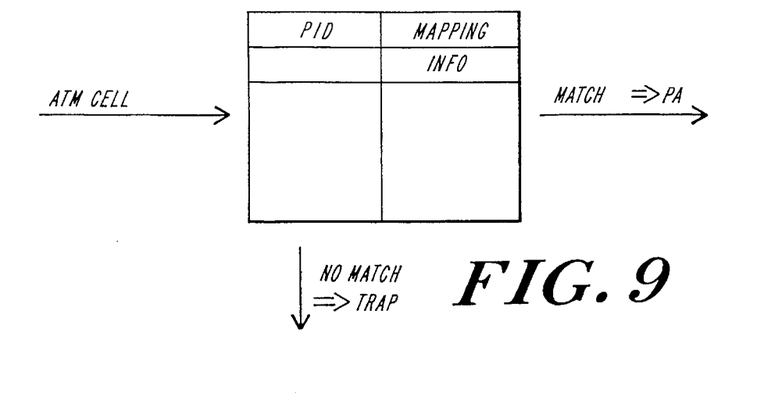
FIG. 9 is a block diagram illustrating the mapping of incoming ATM cells.

As to the protocol illustrated in FIG. 8A, and as illustrated in FIG. 9, a 64 bit buffer ID may be used as a key into an associative cache. The identifier on the incoming message is checked with the identifiers stored in the buffer. If a match is found, the matching buffer entry is extracted and the offset in the message is added to the buffer base address to form a virtual address which is then mapped to a physical address.

Figure 10:
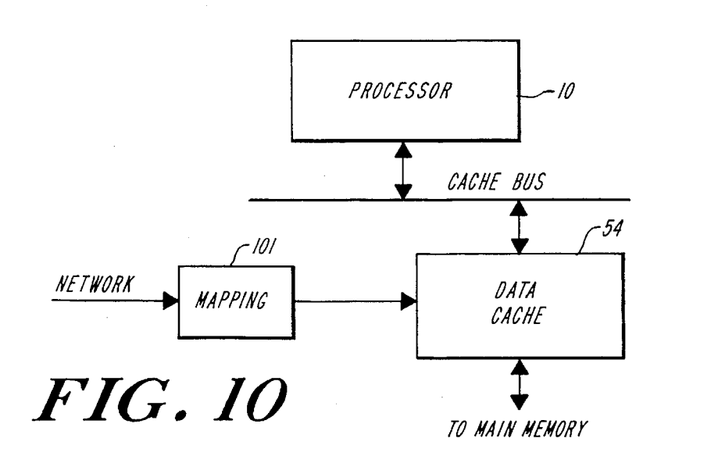
FIG. 10 is a block diagram illustrating the direct coupling of the network to a cache through the utilization of a standard mapping technique.

In summary, and as recapitulated in FIG. 10, as to the cache connected network interface, incoming messages are inserted directly into the data cache after mapping 101. Since the messages are in the memory hierarchy from the beginning, there are no protection or performance issues or the huge size of process address space alleviates the buffer management problem. Each process manages its own address space and there is no longer any competition between processes for the same limited resource.

With the network directly coupled to data cache 54, and with the data cache 54 physically addressed, and assuming a data cache block size at 32 bytes, which matches the data size in the ATM cell format in FIG. 8A, this interface still entails some complexity in the cache controller. On receiving a message, the update of a cache block must occur atomically with respect to that block to prevent the processor from seeing inconsistent data. Thus the data cache controller must allow only one of either the processor or message interface to access a particular cache block at a time. There is of course coordination in use of the address space so the sender does not send a message that overwrites some data in use at the receiving node. Note that message blocks must be marked as dirty to ensure they get written back to memory if they are evicted.

The sending side is relatively straightforward. The send network interface connects directly to the data cache bus. Considering two cases, first, if the block to be sent is in the primary cache, then the processor just causes that block to be written back to the data cache and instructs the send interface to snoop on the data cache bus for the data. If the block to be sent is not in the data cache, the processor does a fetch of that block from the message cache and main memory if it misses in the data cache, and again instructs the send interface to snoop on the data cache bus for the data. The processor may optionally decide not to store the data block in its primary cache.

While the receive scheme described previously will work, it suffers from performance problems. First, because of cache inclusion, the primary cache copy must be evicted when the data cache copy is evicted. The working set of the cache hierarchy is thus diluted by incoming messages, especially if they are for a different process than that currently executing. This decreases the performance of the processor. In the worst case, a cache block is flushed back to memory by a message arrival and then that cache block is brought right back into the cache by the next processor data access, possibly displacing the message block back to main memory. Thus one message arrival could cause up to three block transfers to and from main memory. In such a case one should just directly put the message block in main memory. This worst case problem should be relatively rare, especially if the cache is large. The effect of the cache dilution on processor performance depends on the message rate and the cache size.

Second, message blocks may be evicted from the cache before they are accessed, and thus latency may be increased. In the case where the message is for a different process than that currently executing it is not necessarily deleterious to evict the message. However, the cost of bringing the message back into the cache would be part of the cost of a context switch. Furthermore, there is no guarantee that a message arriving for the current process will stay in the cache long enough for the process to access it, even without a context switch. Most secondary caches are direct mapped, so there is no LRU replacement policy. If the processor accesses a memory location that maps to the same slot as the message block, the message block will be evicted. Again, this effect can be reduced by making the cache large. Still, the cost of a context switch is increased by the message blocks for other processes that got evicted.

Third, the processor may be blocked on simultaneous access to cache slots. As above, this is considered to be rare if the cache is large enough.

Fourth, real caches seldom have "free" blocks, so finding a block for a message means evicting a clean or dirty block. This increases the time to store a message and also makes the cache controller more complicated. As a side effect, writing back dirty cache blocks consumes bandwidth and thus, there is less main memory bandwidth available for the processor.

One way to solve the first problem, and the second problem to some degree, is to only store a message in the data cache if its PID matches the PID of the current process and otherwise the message is stored in main memory. It is, of course, useful for the sender to indicate if a message should be stored in the main memory. Such a cache bypass hint could be used when the sender knows it is sending a long string of messages that will not be immediately used by the destination.

However, this modification effectively increases the context switch time. To reduce cache dilution and keep context switch costs low, an alternative solution is to "lock" blocks in the cache. However, this poses the problem of conflicts and possible deadlock if there is no free slot available because of locked cache blocks. This is especially acute in most modern workstation designs where the secondary cache is direct mapped.

Figure 11:
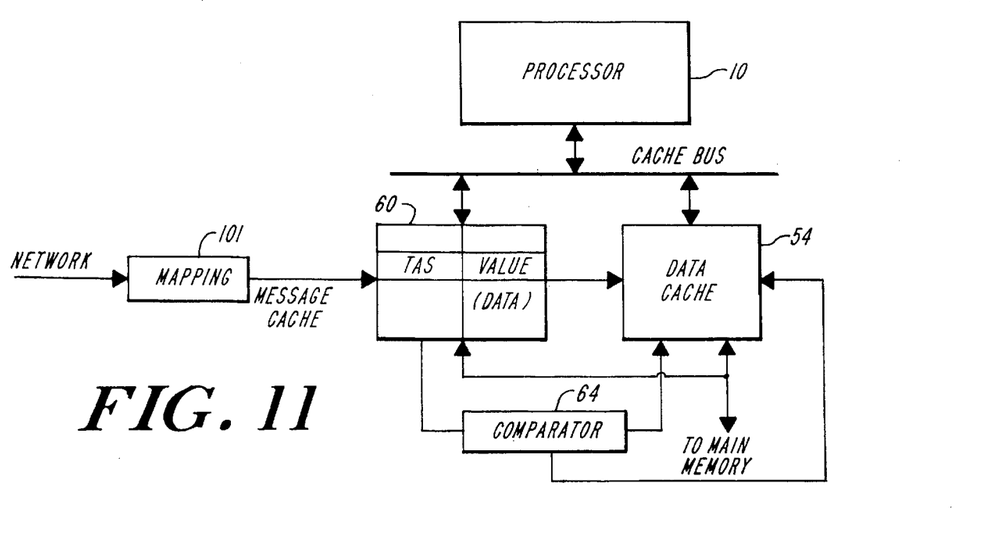
FIG. 11 is a block diagram illustrating in further detail the message cache/data cache system illustrated in FIG. 4; and, FIG. 12 is a detailed block diagram illustrating the composition of the data cache of FIG. 11 showing a duplicate address tag structures and means for conflict resolution through the utilization of a conflict controller, also utilizing the high/low direct address mapping technique described in connection with FIG. 11.

The above problems with an interface which utilizes only a single direct coupled data cache is solved by adding another cache at the data cache level that is exclusively for storing messages. The idea is to piggy-back this message cache 60 on the data cache 54 as shown in FIG. 11.

In one embodiment, a mapping is performed by mapping unit 101 prior to coupling the network to the message cache. In this embodiment, the address which is preincorporated into the message includes high and low portions corresponding respectively to most significant bits and least significant bits. To enable storing a message in the message cache, the network interface with the least significant bits of the message address is used to locate a cache slot. The most significant bits of the message address are then stored in the message data in the tag-and-data portions of that cache slot, respectively. This simple scheme describes a direct mapped cache. The message cache could also be a set associative cache.

To access a location in the message cache, the processor first looks to least significant address bits for entry into a slot in the message cache followed by a comparison of the most significant address bits with the most significant address bits, i.e., the tag, stored at a slot. If this comparison results in a match, the associated data is accessed from the slot. Otherwise, the desired data is not in the message cache.

The access procedure is as follows: on an access, read or write, by the processor, the data cache is checked. If the data cache cannot satisfy the access, the message cache is checked. If the message cache also cannot satisfy the access, main memory is finally accessed. Thus the processor checks the data cache first and only goes to the message cache if there is a miss in the direct mapped cache. Therefore the fast path to the data cache is not affected in the common case of a hit in the data cache.

Although this explanation makes message cache 60 sound like a tertiary cache it is not. The message cache contents are not a superset of the data cache contents. To a first approximation, only the network interface may allocate data in the message cache and only the processor may allocate data in the data cache. Thus, in fact, the network and processor each write into different caches, the message and data caches respectively. The message cache can be much smaller than the data cache. Finally, the cache accesses need not be sequential, since the data and message caches may both be searched at the same time.

The addition of the piggy-back message cache does introduce a cache consistency issue since a memory block with a given address could be in either cache.

The piggy-backed message cache solves two problems in integrating messages into the cache. It prevents cache dilution and keeps the message data quickly accessible, even across context switches. However, the option to store the message in cache or main memory should be maintained. The key is to manage the memory hierarchy and put the message where it will be needed. Main memory is not the final destination in memory hierarchy for data.

To solve the cache consistency problem and as priorly described in FIG. 4, whenever the network interface writes a block into the message cache, the data cache must be checked at 64 for a block with the same address and any such block must be flushed from the data cache or invalidated. Actual consistency conflicts, blocks in both message and data caches at same address, ought to be quite rare. However, the challenge is to ensure that checking for such rare conflicts imposes minimal overhead.

To detect inconsistencies between the message and data caches, one must quickly be able to check if a given address is contained in the data cache. This can be done by checking the data cache tags. The most straightforward way of doing this is to block processor accesses to the data cache tags while the message cache accesses the tags. However, this would interfere with processor access to the data cache and thus reduce the processor performance.

Figure 12:
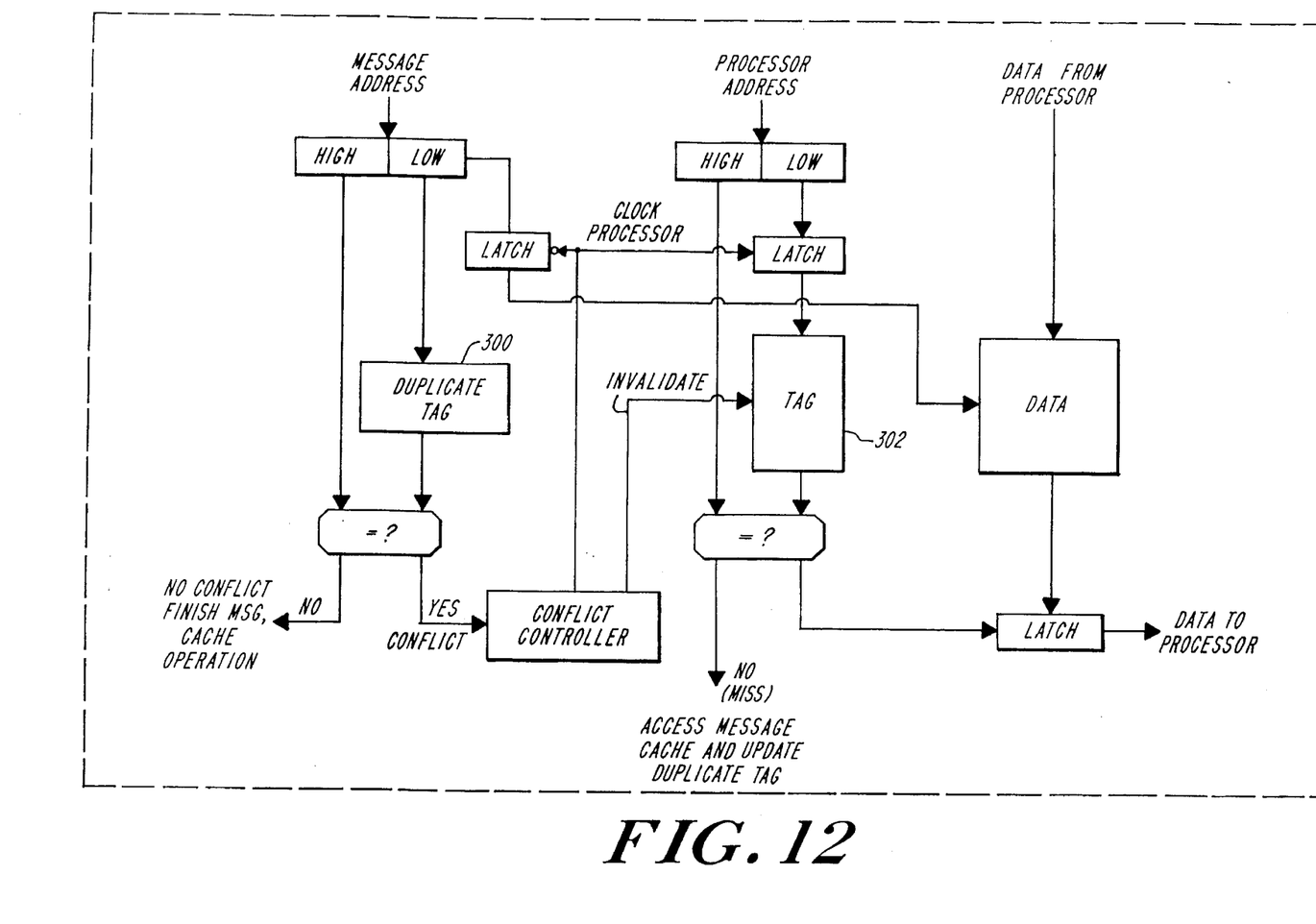

This particular problem can be solved by using dual ported tags for the data cache. However, dual ported tags are large and slow. Instead, and as priorly described in FIG. 5, the cache tag portion of the data cache is duplicated as illustrated at 300 and 302. This reserves the original cache tag for access by the processor and reserves the duplicate cache tag for consistency checking by the message cache. This achieves the aim of preventing message arrival from affecting the processor performance while still preventing cache inconsistencies. FIG. 12 shows the dual tag structure and the various interconnections minus the interconnections for updating the tags.

Referring to FIG. 12, if no conflict is detected between the message address and an address in the data cache, then the message cache operation proceeds as if there was no data cache. If a conflict is detected, the conflict controller, which is a small finite state machine, steps through the following procedure:

1. disable the address latch so the processor is blocked from accessing the tag;
2. enable the address connection from the message cache;
3. invalidate the tag entry at the corresponding addresses in both the tag and duplicate tag sections;
4. disable the address connection from the message cache; and
5. enable the address latch so the processor can access the tag.

On completion, the store of a message data block in the message cache is complete.

The consistency problem thus reduces to keeping the two tag sections consistent. This is easy to ensure since the tag sections only become inconsistent if the original tag section changes and this only happens if a block is invalidated in the data cache or if a new block enters the data cache as the result of a read or write miss. To handle both these cases one simply needs to add connections in FIG. 12 which allow the processor to block the message cache from accessing the duplicate tag and allow the duplicate tag entry to be updated from the original tag entry. The time to perform this is unimportant since a miss in the data cache already implies many cycles of overhead. Note, it is only necessary to update the duplicate tag if there is a miss in both the data and message caches.

To avoid deadlock when the network and processor access their caches simultaneously, as in the following scenario, the processor has priority in accessing both caches at all times. Deadlock can occur when the network interface writes into the message cache and attempts to read the duplicate tag of the data cache while at the same time the processor misses in the data cache and needs to check the message cache, or the processor is attempting to access the duplicate tags.

In the design described so far the two tag sections are the same size. They need not be the same speed however. The duplicate tag section needs to only operate at a speed suitable for the network interface, not for the processor.

In a variation on the above embodiment, the duplicate tag is provided as a precheck and then if a possible conflict is detected, the processor is blocked and the original tag is checked for a conflict. Given that conflicts should be rare, this will add insignificant delay while allowing the duplicate tag section to be of a smaller size than the original tag section. In this "precheck" arrangement of the duplicate tag, the duplicate tag section only needs to have inclusionary property: it must signal a conflict when one might exist. Note, it is acceptable to falsely signal a conflict when none exists. The above allows the duplicate tag section to determine a match, for example, based on some smaller number of address bits than the original cache uses. To summarize, in one embodiment the Subject Interface separates the tag section into two portions to allow faster concurrent access than what one could get with dual ported cache tags. To regain some of the advantage of the smaller memory required for the dual ported approach, the Subject System only insists on full size and speed of one of the tag sections, while the other tag section may be smaller and slower.

The following describes the access algorithm for the subject network interface:

*Network receive:

Check if the message address is already present in the data cache. If so, invalidate data at that address in the data cache. Check if the message address is already present in the message cache. If so, check if the block already at that location in the message cache is dirty, and if so, write it back to main memory. If there is a copy of that block in primary cache, then the cache controller must flush it from primary cache. Now write the message data to message cache. Finally, mark the message block in message cache as dirty.

*Network send:

If the block to be sent is in the primary cache, then the processor just writes that block back to the secondary cache and instructs the send interface to snoop on the secondary cache bus for the data. If the block to be sent is not in the primary cache, the processor fetches the block from the secondary cache, and maybe main memory if it misses in the secondary cache, and again instructs the send interface to snoop on the secondary cache bus for the data. The processor may optionally decide not to store the data block in its primary cache.

*Processor read:

If miss in data cache, access the message cache. If miss in message cache, then load data from main memory into secondary cache.

*Processor write:

If miss in data cache, access the message cache. If miss in message cache, then either allocate in data cache or write in main memory.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. In a network in which messages having addresses are transmitted to various nodes of said network from one stand-alone computer system to another in which each node has a computer including a processor, and a main memory, a low latency network interface comprising:

a cache at a node dedicated to caching said network messages so as to permit storing message data directly at the address contained in said message, said cache being coupled to the processor and main memory at said node;

means for directly coupling said cache to said network messages, thus to eliminate any buffering between said network and said cache: and, means for sending a message over said network including data and preincorporated information indicating an address in said main memory at which said data is to be finally stored, whereby means are provided for coupling said message to said cache without buffering, with said data being stored in said cache at said address.

2. The interface of claim 1, wherein said cache includes a data cache for temporarily storing data read from said main memory and written to said main memory and a message cache to hold received messages from said network, said message being directly coupled to said message cache such that said address is stored in said message cache and such that said message cache is only accessed by said network, and further including means for storing said address in said data cache, means for determining when the address associated with said message is priorly occupied in said data cache thus to indicate a consistency problem in which the address associated with said message is cached but has different data associated with said address in both caches, means for providing a signal representing said determination, and means responsive to said determination for invalidating the data in said data cache at said address.

3. The interface of claim 2, wherein said processor includes means for first fetching data at said address from said data cache and second from said message cache if data is not present at said address in said data cache.

4. The interface of claim 2, wherein said determining means includes means for comparing the address associated with said message to addresses in said data cache, for generating a conflict indicating signal if there is a match and for invalidating the data in said data cache at said address responsive thereto.

5. The interface of claim 2, wherein said determining means includes means for comparing said address in said message cache with the addresses in said data cache, for generating a conflict indicating signal if there is a match, and for invalidating the data in said data cache at said address responsive thereto.

6. The interface of claim 2, wherein said message and data caches each have tag and memory portions, wherein said data cache is divided into a tag and memory section and a tag-only section thereby to obtain duplicate tag sections, and wherein said determining means includes means for comparing an address associated with said tag-only section of said data cache section with the address associated with an incoming message.

7. The interface of claim 6, wherein said tag-only section is divided into N subsets, and further including means for concurrently updating one tag-only subset of said tag-only section and for simultaneously accessing another tag-only subset of said tag-only section for an address conflict resolution.

8. The interface of claim 6, wherein said tag-only section has a speed and size different from that of the tag portion of said tag and memory section.

* * * * *